Jan. 24, 1961 P. G. VICARD 2,969,187
ATOMIZATION OF LIQUIDS
Filed May 23, 1958
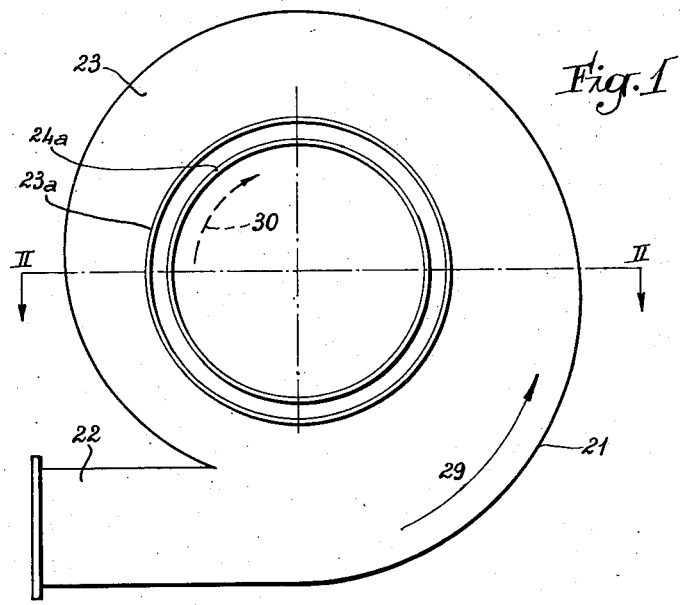
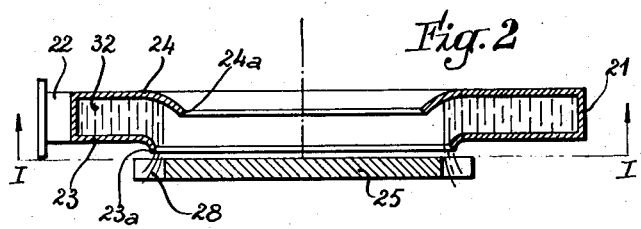
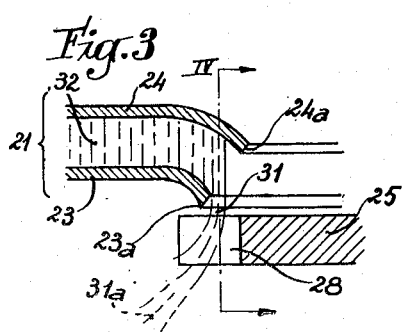
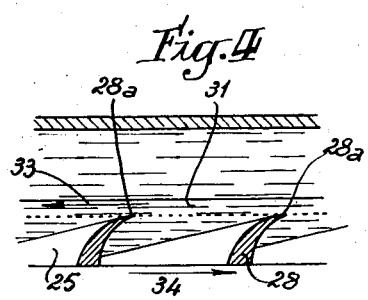
INVENTOR.
PIERRE VICARD
BY
Irwin S. Thompson
ATTY.

United States Patent Office 2,969,187
Patented Jan. 24, 1961

2,969,187

ATOMIZATION OF LIQUIDS

Pierre G. Vicard, 15 Cours Eugenie, Lyon, France

Filed May 23, 1958, Ser. No. 737,245

Claims priority, application France June 11, 1957

1 Claim. (Cl. 239—223)

The present invention relates to an improved atomizer for liquids.

It is known that in many cases it is important to obtain a very fine dispersion or atomization of a liquid in a gas such as air, as for instance in the removal of dust from dust laden gases.

A known method for the atomization of a liquid consists in injecting the latter tangentially into a circular or volute-shaped chamber having a lateral central outlet. The liquid issues from the chamber in the form of a jet rotating at a considerable angular velocity about its own axis and which therefore bursts almost immediately under the action of centrifugal force, thus producing a relatively fine spray. This method is quite satisfactory for many purposes, as for instance for most liquid fuel burners or for sprinklers. But the degree of atomization is insufficient in some particular cases, as for instance when it is desired to separate dust from gases such as smoke particles from flue gases.

It is known that the separation of smoke from combustion gases is an extremely difficult problem owing to the minute dimensions of the solid particles which form the smoke. A widely used method consists in spraying water or other liquid in the dust-laden gases, the water droplets retaining the dry particles which are thereafter much more easily eliminated by electrostatic precipitation, centrifugal separation, etc. But of course this method is only effective if substantially all the original solid smoke particles have met a liquid droplet and this requires that the liquid be divided into an extremely large number of minute droplets or, in other words, that the atomization be extremely fine, and this is very difficult to obtain in actual practice.

An object of this invention is to provide means whereby atomization of a liquid is obtained by cutting a thin continuous rotating liquid film by means of cutting blades moving against the direction of rotation of the film, i.e. under such conditions that the relative velocity of the blades with respect to the film may be the sum of the respective velocities of the liquid film and of the blades.

The rotating liquid film may be obtained by injecting the liquid tangentially into a volute-shaped chamber having a central laterally directed annular outlet. The liquid is thus caused to rotate at a high speed within the volute-shaped chamber and it therefore issues from the central laterally-directed circular outlet thereof in the desired form of a very thin film rotating at a considerable angular velocity about the axis of the chamber. Of course the film thus formed is immediately submitted to centrifugal force and if it were left free to follow its course, it would expand and break into discrete droplets at a relatively short distance from the outlet, say some millimeters. This division would however be insufficient per se for the problem of dust separation.

It would be of course possible to break these droplets by means of rotating baffles, but this division is still insufficient in many cases and more particularly in the problem of dust separation.

In accordance with an aspect of this invention the tubular rotating film is cut by the cutting blades close to the outlet of the volute-shaped chamber, i.e. before it has substantially expanded and while it is still substantially continuous. The cutting blades are conveniently carried by a high-speed rotating wheel disposed co-axially to the volute-shaped chamber and having a diameter substantially smaller than the inner diameter of the liquid film at the outlet of the volute-shaped chamber, whereby the liquid does not impinge on the wheel which therefore does not form a rotating baffle.

It will be observed that owing to the annular character of the central outlet of the volute-shaped chamber there is left a free axial passage through the central portion thereof. In other words the space which is interior to the tubular liquid film issuing from one side of the said chamber communicates with the atmosphere on the other side of the chamber without any obstruction apart from the cutting blades and their carrying wheel. This permits passage of an air draft induced by the cutting blades and by the liquid film itself. This air is mixed with the minute droplets produced by the blades and there is thus obtained a very fine and very efficient mist.

In the annexed drawing:

Fig. 1 is a bottom plan view of an atomizer according to this invention.

Fig. 2 is a longitudinal section thereof.

Fig. 3 is an enlarged representation of a portion of Fig. 2.

Fig. 4 is a section taken along line IV—IV of Fig. 3.

The volute 21 has a tangential inlet 22 and a central annular outlet determined by a central circular aperture in its lower and upper horizontal walls, respectively 23 and 24. As shown the edges or lips, respectively 23a and 24a of the said apertures are directed downwardly and the aperture formed in the upper wall 24 is somewhat smaller than the aperture of the lower wall 23 whereby edge 24a overlaps inwardly edge 23a, the annular outlet being thus directed laterally.

Reference numeral 25 designates a blade-carrying wheel disposed co-axial to the volute. This wheel may be carried by any appropriate conventional means; it is rotated at a high-speed, as for instance by a high-speed motor. As indicated in Fig. 2, its diameter is substantially smaller than the larger diameter of the annular outlet of the volute-shaped chamber, as determined by lip 23a. It will further be seen in Fig. 4 that blades 28 are curved with the curvature facing the side of wheel 25 opposed to the volute and that their cutting leading edge 28a is directed angularly about the general axis of the apparatus in the reverse direction with respect to the tangential inlet 2, i.e. to the direction of rotation of the fluid in the volute. In the bottom plan view of Fig. 1 the fluid rotates in the direction of arrow 29, while wheel 25 rotates in the direction of arrow 30, i.e. anti-clockwise as seen from below.

As illustrated blades 28 are disposed closely adjacent to the lower lip 23a so as to cut the liquid film 31 which issues from volute 1 before it breaks under the action of centrifugal force, i.e. in a zone wherein it is still continuous. Since film 31 and blades 28 rotate in opposed directions, their relative velocity is the sum of their individual absolute velocities. With a high speed rotating wheel considerable relative velocities are easily attainable and therefore the atomization may be extremely fine even with a moderate inlet pressure of the fluid.

Referring more particularly to Figs. 3 and 4, it will be appreciated that the liquid annulus 32 formed within volute 21 rotates anti-clockwise as seen from below, i.e. clockwise as seen from above, or backwardly in Fig. 3 and from right to left in Fig. 4 (arrow 33), while wheel

25 rotates in the reverse direction, i.e. clockwise as seen from below, anti-clockwise as seen from above, forwardly in Fig. 3 and from left to right in Fig. 4 (arrow 34). The liquid film 31 tends to spread conically, as indicated at 31*a* in Fig. 3, and to break under the action of centrifugal force, but it is cut by blades 28 in the zone where it is still continuous.

It is important to note that the velocity which is to be taken into account for the atomization is the relative linear velocity of blades 28 with respect to film 33 (i.e. the sum of their individual linear velocities) and not the relative angular velocity. Now the linear velocity of a point rotating about an axis at a radial distance $r$ therefrom is $v=r\omega$, $\omega$ being the angular velocity. It follows that for the same angular velocity (i.e. for the same speed in r.p.m. of the driving motor 27) a very high effective velocity may be obtained with a wheel 25 of substantial radius (or diameter), which is rendered possible by the fact that a substantial circular free space is left in the central portion of volute 21.

It is also to be noted that the diameter of wheel 25 is such that same is wholly located within the tubular liquid film and that no liquid therefore impinges on said wheel which does not form a baffle member.

It will further be appreciated that blades 28 also act as propelling vanes for the air which surrounds wheel 25 and which is therefore urged downwardly. Owing to the fact that the central outlet of the volute-shaped chamber is annular and not circular, there exists a free passage through the central portion of the said chamber and therefore there is formed a downwardly flowing air draft which is mixed with the minute water droplets resulting from the action of the blades in the form of a very fine and very efficient mist.

I claim:

An atomizer for liquids comprising a substantially flat spiral annular volute having an outer tangential inlet a lateral central circular outlet on one of its sides and a lateral central circular air inlet on its other side, with said air inlet of smaller diameter than said outlet, said outer tangential inlet receiving a liquid under pressure which rotates in the volute and issues from said central circular outlet in the form of a thin continuous substantially cylindrical rotating film; a wheel disposed coaxially to said annular volute, said wheel having a diameter substantially smaller than said lateral central circular outlet, and said wheel rotating at a high speed in the reverse direction with respect to the direction defined by said tangential inlet peripheral cutting blades radially carried by the periphery of said wheel close to said lateral central outlet, each of said blades having a cutting leading edge situated on the side of said wheel facing said volute and directed about the axis of said wheel and of said volute in the reverse direction with respect to said tangential inlet, a trailing edge situated on the other side of said wheel, and an intermediate curved portion with the concavity directed obliquely towards said last-named other side of said wheel, to cut said rotating liquid film immediately as it issues from said central circular outlet in continuous form to produce a mist without said film impinging on said wheel, and also to draw air internally of said substantially cylindrical liquid film through said lateral central air inlet and to mix same with the mist produced by said blades.

References Cited in the file of this patent

UNITED STATES PATENTS

| | | |
|---|---|---|
| 180,470 | Elbers | Aug. 1, 1876 |
| 1,762,356 | Schmidt | June 10, 1930 |
| 2,023,061 | Vicard | Dec. 3, 1935 |

FOREIGN PATENTS

| | | |
|---|---|---|
| 345,714 | Great Britain | Apr. 2, 1931 |
| 988,089 | France | Apr. 25, 1951 |